United States Patent [19]

Grams et al.

[11] 3,931,416
[45] Jan. 6, 1976

[54] PROCESS FOR MANUFACTURING CALCIUM-SODIUM-PHOSPHATE CONSISTING MAINLY OF RHENANIT AND SUITABLE FOR USE AS SUPPLEMENTARY ANIMAL FOOD

[75] Inventors: Gerhard Grams, Kleineichen; Hans Ratajczak, Cologne, both of Germany

[73] Assignee: Chemische Fabrik Kalk GmbH, Germany

[22] Filed: Aug. 8, 1974

[21] Appl. No.: 495,817

[30] Foreign Application Priority Data
Aug. 11, 1973  Germany............................ 2340739

[52] U.S. Cl. ................ 426/648; 423/308; 423/311; 426/74; 426/465; 426/807
[51] Int. Cl.² ............................................ A23K 1/16
[58] Field of Search ............. 426/74, 220, 381, 465, 426/807, 648, 649; 423/306, 308, 311

[56] References Cited
UNITED STATES PATENTS

| 1,902,832 | 3/1933 | Caldwell............................. 426/220 |
|---|---|---|
| 2,442,969 | 6/1948 | Butt..................................... 426/381 |
| 2,893,834 | 7/1959 | Richardson......................... 423/306 |
| 2,997,367 | 8/1961 | Williams.............................. 423/306 |
| 3,058,804 | 10/1962 | Tynan............................ 426/220 X |
| 3,074,780 | 1/1963 | Smalter........................... 426/220 X |
| 3,101,999 | 8/1963 | Malley et al.................... 426/807 X |
| 3,426,837 | 2/1969 | Conte et al. ........................ 426/381 |
| 3,658,549 | 4/1972 | Geiersberger et al. ........... 426/74 X |
| 3,851,086 | 11/1974 | Baumann...................... 426/807 X |

FOREIGN PATENTS OR APPLICATIONS
635,635   1/1962   Canada

*Primary Examiner*—Robert L. Lindsay, Jr.
*Assistant Examiner*—Arthur L. Corbin
*Attorney, Agent, or Firm*—Laurence, Stokes & Neilan

[57] ABSTRACT

Calcium-sodium-phosphates suitable for animal feed use are produced by heating a granulated mixture containing 1.75 to 2.25 moles calcium oxide and 1.25 to 0.75 moles sodium oxide per mole of $P_2O_5$ for at least 10 minutes to between 600° to 1,000°C, while being subjected to vigorous movement and cooling to room temperature.

2 Claims, No Drawings

PROCESS FOR MANUFACTURING CALCIUM-SODIUM-PHOSPHATE CONSISTING MAINLY OF RHENANIT AND SUITABLE FOR USE AS SUPPLEMENTARY ANIMAL FOOD

In Rhenanit, a tertiary calcium-sodium phosphate insoluble in water and with the formula $CaNaPO_4$, phosphoric acid is present in a form readily taken up by plants and animals. Because of its content of calcium and sodium, as well as the absence of fluorine, otherwise very frequently contained in technical and natural phosphates, Rhenanit is suitable for use as a supplementary food in animal nutrition.

Various processes already exist for manufacturing water-soluble sodium phosphates which can be used as supplementary animal food. In order to ensure that these products do not contain any harmful fluorine, di- or tricalcium phosphates of low fluorine content are used as starting materials. According to specifications given in German Pat. No. 563,234, these materials are converted into primary calcium phosphate using concentrated phosphoric acid and are then partially neutralized with anhydrous sodium carbonate. This procedure is improved upon by measures described in German Pat. No. 686,950 according to which instead of sodium carbonate a sodium salt of a volatile but still considerably concentrated acid is used, which can be added with the phosphoric acid during or even before the decomposition of the phosphate. Since the temperature to be maintained during this reaction is below 200°C, and lies preferably in the range of only 100° to 150°C, only a mixture of sodium phosphate and dicalcium phosphate results.

Calcium-sodium-phosphates are also known to be obtainable by decomposition of dicalcium phosphate and sodium carbonate at temperatures ranging from 600° to 1,200°C. If this process is carried out at temperatures below approx. 800°C in the form of the so-called sinter process, the final product still contains a certain amount of nondecomposed carbonate. These final products are however free of fluorine, if obtained in a process using a dicalcium phosphate without fluorine content.

A fundamental disadvantage of this existing process lies in the fact that the di- or tricalcium phosphates used as initial materials must themselves first be processed from crude phosphate. Insofar as the final products obtained by this existing process are to be used as supplementary animal food, every effort must be made to obtain an intermediate with the lowest possible fluorine content. Recognition of these facts led to the development of various processes for manufacturing calcium-sodium-phosphates which would render an isolated production of these intermediates inessential. In these processes crude phosphates, phosphoric acid and sodium salts of volatile acids are decomposed at high temperatures, whereby the fluorine contained in the crude phosphate is at the same time largely expelled. For this purpose it is necessary — as stated in German Pat. No. 967,674 — to calcine the mixture of reaction components for a considerable period in the presence of steam at a temperature between 1,000° and 1,200°C. The mixture of reaction components can preferably be first annealed at temperatures between 1,000° and 1,2000°C.

Similar processes are also described in German interpretation specification No. 1,816,660 and U.S. Pat. Nos. 2,442,969 and 2,893,834. In other processes, primary or secondary sodium phosphates are used instead of the mixture of phosphoric acid and sodium compounds, as for example in the processes described in German interpretation specification No. 1,062,259 and U.S. Pat. No. 3,058,804. In U.S. Pat. No. 2,997,367 and Canadian Pat. No. 635,635, the possibility of using triple phosphate instead of phosphoric acid is mentioned. For this purpose, as is explained in Canadian Pat. No. 635,635, a temperature range of 370° to 1,480°C is required for carrying out the decomposition process, emphasis being laid on the fact that poor results are to be expected at conversion temperatures below approx. 1,200°C. Descriptions of experiments given in this Patent show that at a reaction temperature of 400°C in the presence of triple phosphate only 59 %, and in the presence of phosphoric acid only 22 % of the crude phosphate is decomposed. The necessary condition common to all these known processes is the maintaining of a reaction temperature of at least 1,000°C, in some cases even of up to 1,400°C, in order to ensure the creation of a largely low-fluorine final product, the $P_2O_5$ content of which will have practically complete physiological effectiveness.

A process for manufacturing a slow-acting fertilizer from crude phosphate, potassium hydroxide and phosphoric acid is known from US Pat. No. 3,698,885, according to which the starting materials are mixed in relative quantities such that the molar ratio $CaO : K_2O : P_2O_5$ in the mixture is $1.7 - 3.7 : 1.2 - 2.0 : 1$. This mixture is then decomposed at a temperature of 800° to 1,100°C. Higher temperatures cannot be applied here, as otherwise considerable losses of potassium would result. In these processes it is furthermore accepted that the fluorine contained in the crude phosphate will remain in the final product, since an excess of cations is always present in the reaction mixture. For this reason the products obtained by these processes are not suitable for use as supplementary animal food. The high potassium content of these products is a further disqualification of their use for animal nutrition purposes.

Since the high reaction temperatures required by the existing processes for producing calcium-sodium-phosphates of animal food quality from crude phosphate necessitate high equipment expenditure and high power input, investigations have been carried out to find new processes which do not need these high reaction temperatures, but which will still yield products of a quality suitable for use in animal nutrition.

A process has now been found for producing calcium-sodium-phosphates consisting mainly of Rhenanit and suitable for use as supplementary animal food, by heating a mixture of crude phosphate, phosphoric acid and sodium hydroxide or sodium compounds with anions, volatile under reaction conditions, up to a maximum temperature of 1,000°C. This process is distinguished by the fact that the reaction components are granulated as a mixture which per mole $P_2O_5$ contains 1.75 to 2.25 mole CaO and 1.25 to 0.75 mole $Na_2O$; the granulated material is then heated, at the same time being subjected to vigorous movement, for at least 20 minutes up to temperatures of 600° to 1,000°C, preferably 800° to 1,000°C, and is finally cooled down to room temperature.

All forms of crude phosphate common in the fertilizer and animal feed industry can be used in this newly-invented process.

In addition to sodium hydroxide, all compounds with anions volatile under reaction conditions, particularly heating to high temperatures, are suitable as sodium component. Such compounds are for instance sodium carbonate, sodium hydrogen carbonate, sodium chloride, sodium sulphate or sodium nitrate. These compounds can also be used mixed with each other as well as together with sodium hydroxide. The most practical method of obtaining the necessary phosphoric acid is by decomposition of crude phosphate using concentrated sulphuric acid. Thermal phosphoric acid may however also be used for the invented process. In all cases this phosphoric acid must conform to the requirements with regard to purity and concentration which must be fulfilled by a phosphoric acid of technical grade.

The starting materials are granulated while being vigorously mixed together. This mixing can be done in commonly used granulating equipment such as double-screw mixers or rotary drums. The granulated material thus obtained is then dried. For this purpose it can be heated, while being subjected to movement, to temperatures ranging preferably from 80° to 120°C. This phase of the process can also be performed in heated rotary drums if necessary, or using other equipment suitable for such purposes.

In the next stage of the process, which may be carried out directly after that described above, or at a later date and in a different location, the granulated material obtained in this way is heated, being at the same time subjected to vigorous movement, for at least 10 minutes up to temperatures of 600° to 1,000°C, preferably 800° to 1,000°C. This heating can be done with all directly heated equipment suitable for use in calcination processes, such as rotary kilns or storey furnaces and other forms of roasting furnace. Fluidized bed reactors are also excellently suited for this purpose.

This heating of the initial mixture can be performed either in a continuous or discontinuous manner. The essential requirement is that the reaction mixture is heated to a temperature between 600° and 1,000°C, preferably between 800° and 1,000°C, and that this temperature is maintained during the reaction period lasting from at least 10 minutes to preferably 5 hours. During this period the initial components are converted into a product which quantitatively consists chiefly of Rhenanit, which has the formula $CaNaPO_4$. At the same time, the fluorine contained in the crude phosphate and the technical phosphoric acid is expelled to such an extent that a final product containing less than 0.2 % by weight fluorine is obtained. According to the standards of technology existing hitherto, such a thorough defluorination could not have been expected at a temperature below 1,000°C. The product withdrawn from the calcination unit is then cooled down to room temperature.

Cooling drums or other cooling equipment suitable for cooling down loose reaction material from approx. 1,000°C to room temperature can be used for this purpose.

The products thus obtained are especially suitable for use as mineral supplementary food in animal nutrition, where they have a demonstrably higher degree of effectiveness than mixtures of calcium and sodium phosphates.

Several examples will now serve to illustrate the process which has been invented.

EXAMPLE 1

100 parts by weight of ground Morocco phosphate are mixed and simultaneously granulated with 33.9 % by weight $P_2O_5$, 52.1 % by weight CaO and 3.9 % by weight F with 50 parts by weight technical soda and 60 parts by weight technical phosphoric acid with 53.6 % by weight $P_2O_5$. The granulated material is dried at a temperature of 90° to 120°C and the fraction is screened out at between 1 and 3 mm for the reaction. This granulated material is then calcined in a rotary kiln at temperatures of 800°C for a period of 2.5 hours. The final product subsequently obtained contains 42.7 % by weight $P_2O_5$, 13.8 % by weight Na, 24.0 % by weight Ca and 0.13 % by weight F. The X-ray diagram shows it to consist mainly of Rhenanit.

EXAMPLE 2

100 parts by weight of ground crude phosphate are mixed and simultaneously granulated with 37.1 % by weight $P_2O_5$, 50.6 % by weight CaO and 3.5 % by weight F with 69 parts by weight technical soda and 67 parts by weight technical phosphoric acid with 54.0 % by weight $P_2O_5$. The granulated material is dried and the fraction is screened out at between 0.5 and 1 mm for the reaction. The granules are then calcined in a fluidized bed reactor at a temperature of 800°C for a period of 30 minutes. The final product yielded by this process contains 42.7 % by weight $P_2O_5$, 17.3 % by weight Na, 21 % by weight Ca and 0.15 % by weight F. The X-ray diagram shows it to consist mainly of Rhenanit.

EXAMPLE 3

Applying the same method as for Example 2, 100 parts by weight of ground crude phosphate are mixed with 36 parts by weight technical soda and 40 parts by weight technical phosphoric acid with 53.0 % by weight $P_2O_5$, granulated, screened out and calcined in a fluidized bed reactor at a temperature of 900°C for a period of 2 hours. The final product obtained contains 42.7 % by weight $P_2O_5$, 11.0 % by weight Na, 26.5 % by weight Ca and 0.17 % by weight F. The X-ray diagram shows the product to consist mainly of Rhenanit.

EXAMPLE 4

Following the same procedure as for Example 2, 100 parts by weight of ground crude phosphate are mixed with 60 parts by weight technical soda and 51 parts by weight technical phosphoric acid with 53 % by weight $P_2O_5$, granulated, screened out and calcined in a fluidized bed reactor at a temperature of 900°C for a duration of 3 hours. The final product obtained contains 40.9 % by weight $P_2O_5$, 16.5 % by weight Na, 23.0 % by weight Ca and 0.18 % by weight F. The X-ray diagram shows the product to consist mainly of Rhenanit.

EXAMPLE 5

100 parts by weight of ground Morocco phosphate are mixed and simultaneously granulated together with 33.9 % by weight $P_2O_5$, 52.1 % by weight CaO and 3.9 % by weight F with 55 parts by weight ground sodium chloride and 60 parts by weight of technical phosphoric acid with 53.6 % by weight $P_2O_5$. The granulated material is dried and the fraction screened out at between 1 and 3 mm for the reaction.

These granules are then calcined in a rotary kiln at a temperature of 800°C for a period of 30 minutes. The final product yielded by this process contains 43.0 % by weight $P_2O_5$, of which 99.5 % (rel.) are soluble in citric acid, 14 % by weight Na, 24.3 % by weight Ca, 0.05 % by weight F and 0.2 % by weight Cl. The X-ray diagram shows the product to consist mainly of Rhenanit.

We claim:

1. In a process for manufacturing calcium-sodium-phosphates consisting mainly of Rhenanit and suitable as supplementary animal food by heating a mixture of crude phosphate, phosphoric acid and sodium hydroxide or sodium compounds with anions, which are volatile under the process reaction conditions, to temperatures not exceeding 1,000°C, the improvement comprising granulating the mixture which contains 1.75 to 2.25 mole CaO and 1.25 to 0.75 mole $Na_2O$ per mole $P_2O_5$, drying the resulting granules, heating the granules for at least 10 minutes, while being subjected to vigorous movement, up to temperatures between 600° to 1,000°C so as to defluorinate the granulated mixture, and finally cooling the granules to room temperature so as to obtain a calcium-sodium-phosphate product having a substantially reduced fluorine content.

2. Process according to claim 1, wherein the granules are heated to a temperature of 800° to 1,000°C.

* * * * *